United States Patent [19]
Hart et al.

[11] Patent Number: 5,788,338
[45] Date of Patent: Aug. 4, 1998

[54] TRAIN BRAKE PIPE REMOTE PRESSURE CONTROL SYSTEM AND MOTOR-DRIVEN REGULATING VALVE THEREFOR

[75] Inventors: James E. Hart, Trafford; Gary M. Sich, Irwin, both of Pa.

[73] Assignee: Westinghouse Air Brake Company, Wilmerding, Pa.

[21] Appl. No.: 677,584

[22] Filed: Jul. 9, 1996

[51] Int. Cl.⁶ .................................................. B60T 11/26
[52] U.S. Cl. .................................. 303/3; 303/15; 303/81
[58] Field of Search ................................ 303/3, 15, 20, 303/36, 81, 39

[56] References Cited

U.S. PATENT DOCUMENTS

| | | | |
|---|---|---|---|
| 5,332,297 | 7/1994 | Cunkelman et al. | 303/20 X |
| 5,383,717 | 1/1995 | Fernandez et al. | 303/81 X |
| 5,494,342 | 2/1996 | Engle | 303/81 X |
| 5,564,794 | 10/1996 | Hart | 303/3 |
| 5,638,276 | 6/1997 | Hart | 303/3 X |

*Primary Examiner*—Lee W. Young
*Attorney, Agent, or Firm*—Gary J. Falce

[57] ABSTRACT

A regulating valve device is provided for utilization with an end-of-train unit in order to reduce a train brake pipe pressure from the rear end in accordance with a pressure reduction initiated at the locomotive on the front end. A stepping motor under control of a microprocessor controls the compression of a spring to establish a target pressure corresponding to a pressure command signal transmitted from the locomotive to the end-of-train unit. The service exhaust valve device regulates the brake pipe pressure to the target pressure corresponding to the spring compression set by the stepping motor and includes an arrangement for overriding the motor control in the event of a fault condition that prevents the motor from resetting the spring to its initial compression when it is desired to recharge the brake pipe to release a brake application.

26 Claims, 4 Drawing Sheets

5,788,338

1

TRAIN BRAKE PIPE REMOTE PRESSURE CONTROL SYSTEM AND MOTOR-DRIVEN REGULATING VALVE THEREFOR

FIELD OF THE INVENTION

The present invention relates, in general, to a pneumatic brake pipe pressure reduction regulating valve for exhausting the air pressure in the brake pipe of a railroad train at a location remote from the train locomotive in response to and concurrently with a service reduction of brake pipe air pressure at the train locomotive and, more particularly, this invention relates to such a regulating valve that utilizes an electric motor drive.

BACKGROUND OF THE INVENTION

There is currently on effort underway by suppliers of railroad braking equipment to develop electro-pneumatic brakes for railroad freight trains. It is generally acknowledged in the industry that such an electro-pneumatic brake system will substantially enhance the operation of a train by achieving faster brake response, more equalized car retardation and more uniform braking throughout a long train of cars.

These enhanced results are based on the assumption that all of the cars, or at least a majority of the cars, making up a train will be appropriately equipped for utilizing such improved electro-pneumatic braking, in which case direct control of the brake cylinder pressure is envisioned. With the exception of certain unit trains, however, it cannot be reasonably expected that any such majority of cars will be immediately implemented with the electro-pneumatic equipment required to achieve such direct brake cylinder pressure control.

Accordingly, for the present, indirect brake cylinder pressure control can be utilized, in which the train brake pipe pressure is controlled by electro-pneumatic means at one or several remote cars throughout the train in order to accelerate reductions of brake pipe air pressure and accordingly obtain a faster and more uniform brake response without controlling the brake cylinder pressure directly.

Presently, most railroad trains are required to utilize an end-of-train unit disposed on the last car in the train consist. Such an end-of-train unit, among other critical functions, may be equipped to independently and remotely initiate a reduction of the brake pipe air pressure from the rear of the train in response to a control command initiated by the train operator at the locomotive. This may be accomplished, for example, by the operator transmitting a brake pipe pressure command signal from the locomotive to the end-of-train unit via radio communication.

SUMMARY OF THE INVENTION

It is an object of the present invention to provide an electric motor operated regulating valve device for releasing air pressure from the brake pipe of a railroad train at a location remote from the locomotive until the pressure reduction at the remote location corresponds to a reduction initiated at the locomotive.

It is another object of the invention to provide a remote regulating valve device in accordance with the foregoing that can be suitably sized for installation in portable end-of-train units.

Another object of the invention is to provide a regulating valve device that does not interfere with the brake pipe being recharged in the event a power failure occurs during a brake application.

2

Another object of this invention is to provide a motor operated brake pipe pressure regulating valve device which automatically adjust a pressure exhaust orifice to maintain a target brake pipe pressure as a transient pressure gradient along the train brake pipe is dissipated.

Still another object of the invention is to provide a motor-operated regulating valve device having a response characteristic that is independent of the motor response characteristic.

A final object of the invention is to provide a motoroperated regulating valve device having low power consumption.

In accordance with the foregoing objectives, there is provided a regulating valve device for reducing the pressure in a brake pipe of a railroad train at a location remote from the train control station. The regulating valve device includes an electric motor that adjusts the compression of a control spring in response to a brake pipe pressure command signal. An exhaust valve is urged to a closed position by the spring force to interrupt communication between a supply port to which the brake pipe is connected and an exhaust port. The exhaust valve is further subject to brake pipe pressure in response to which the exhaust valve is urged toward an open position. Relaxation of spring force allows the brake pipe pressure to open the exhaust valve and escape to atmosphere until the brake pipe pressure is reduced sufficiently to allow the effective spring force to close the exhaust valve at the commanded target brake pipe pressure.

In different aspects of this invention, a solenoid valve is employed to override the control spring in the event such a fault condition exists as would prevent the electric motor from resetting the control spring when it is desired to recharge the brake pipe to release a brake application.

BRIEF DESCRIPTION OF THE DRAWINGS

These and other objects and advantages of the invention will now be explained with reference to the accompanying drawings in which.

DESCRIPTION AND OPERATION

Figure 1:
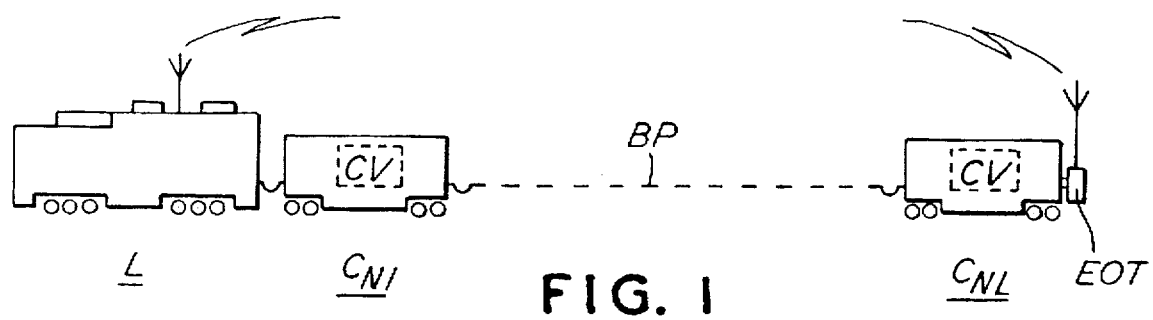
FIG. 1 is a schematic illustration of a railroad train comprising a plurality of freight cars headed by a locomotive having radio communication with an end-of-train unit on the last car of-the train.

As shown in FIG. 1, a plurality of railroad cars $C_{N1}$–$C_{NL}$ are physically coupled to each other and to a locomotive L by typical railroad car couplers (not shown) to form a train and are further coupled pneumatically by a brake pipe BP that extends continuously from the locomotive to the last car $C_{NL}$. Associated with the last car is an end-of-train unit EOT that is communicated with the locomotive via radio signals. The last car $C_{NL}$ of the train is further provided with a brake control valve device CV, as are the other cars $C_N$. These car control valve devices CV are preferably an A.A.R. standard AB type control valve, such as an ABD, ABDW or ABDX valve manufactured by the Westinghouse Air Brake Company. As is well known, control valve devices CV operate to control the car brakes in response to changes in the train brake pipe pressure at the respective cars.

Figure 2:
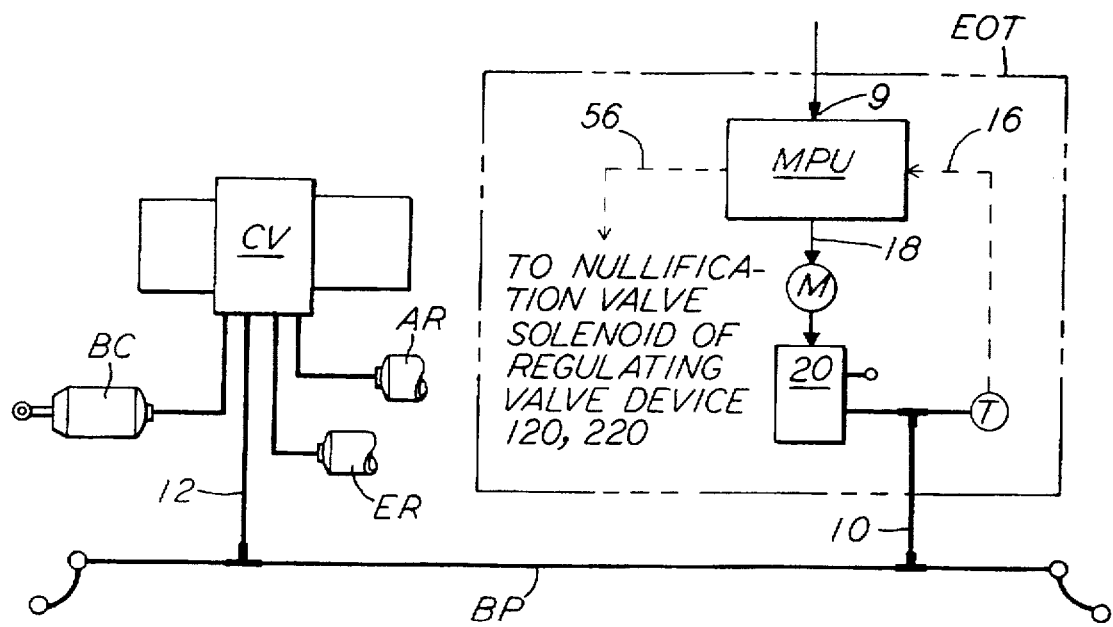
FIG. 2 is a block diagram of a microprocessor based brake pipe pressure control system in which a motor controlled pneumatic regulating valve device according to the present invention is utilized in conjunction with an existing end-of-train unit.

Referring now to FIG. 2, end-of-train unit EOT includes a microprocessor unit MPU and a regulating valve device 20 to which brake pipe BP is connected by a branch pipe 10, and via which microprocessor unit MPU operates to effect a reduction of brake pipe pressure in accordance with reception of a radio transmitted command signal as indicated at reference numeral 9.

Each car $C_N$, including the last car $C_{NL}$, has its control valve CV connected to brake pipe BP via another branch pipe 12. Control valve $C_N$ on each car is associated with an auxiliary reservoir AR and an emergency reservoir ER that are charged via brake pipe BP. These reservoirs provide a source of compressed air for pressurizing the car brake cylinder device BC in response to service and emergency rates of reduction in the brake pipe pressure. Such operation is well-known to those skilled in the art, and thus requires no further explanation.

Figure 4:
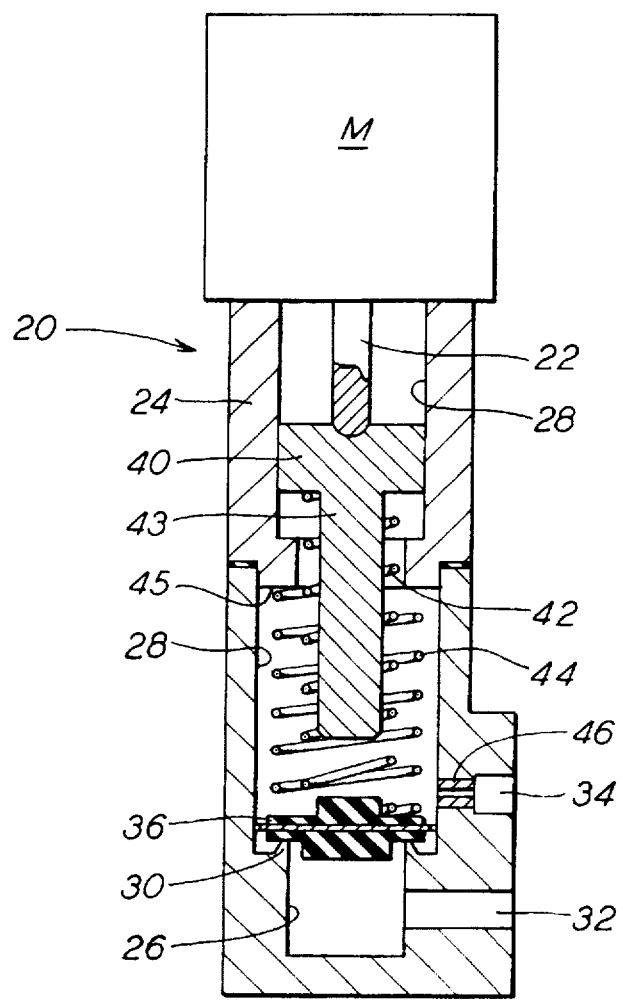
FIG. 4 is a sectional assembly view of a first embodiment of the regulating valve device of FIG. 2.

The invention will now be explained with reference to a first embodiment of regulating valve device 20, as shown in FIG. 4. The command signal transmitted from locomotive L and received at input 9 of microprocessor unit MPU of end-of-train unit EOT corresponds to the brake pipe pressure effective at the locomotive L. This command signal transmitted to the end-of-train unit EOT can be obtained by means of a pressure to electric transducer (not shown) that monitors the locomotive equalizing reservoir pressure, for example.

Figures 5, 6:
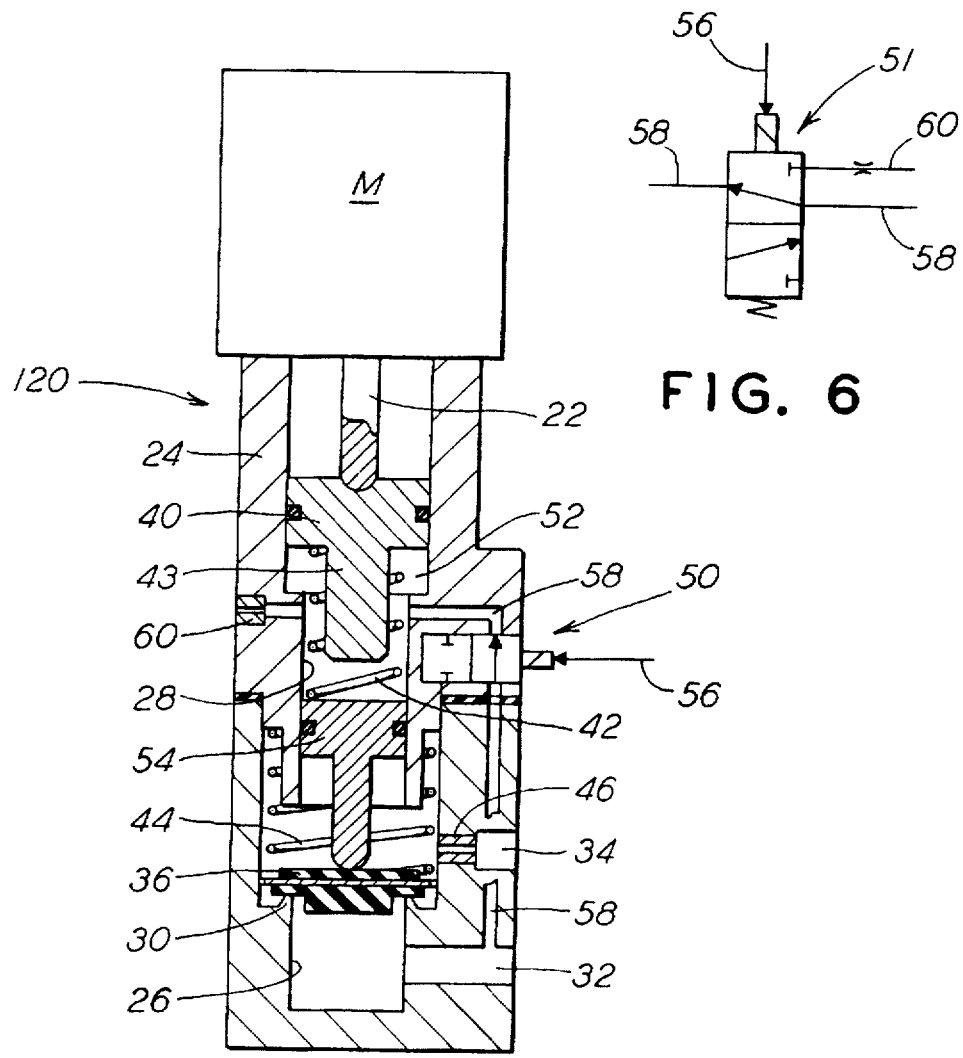
FIG. 5 is a sectional assembly view of a second embodiment of the regulating valve device of the present invention as arranged to obtain failsafe recovery of brake pipe pressure in order to release a brake application in the event the regulating valve motor is rendered inoperable.
FIG. 6 is a diagrammatic view of a three-way solenoid valve suitable as an alternative to the two-way solenoid valve associated with the regulating valve device of FIG. 5, when it is desired to reduce the consumption of air.
Figure 7:
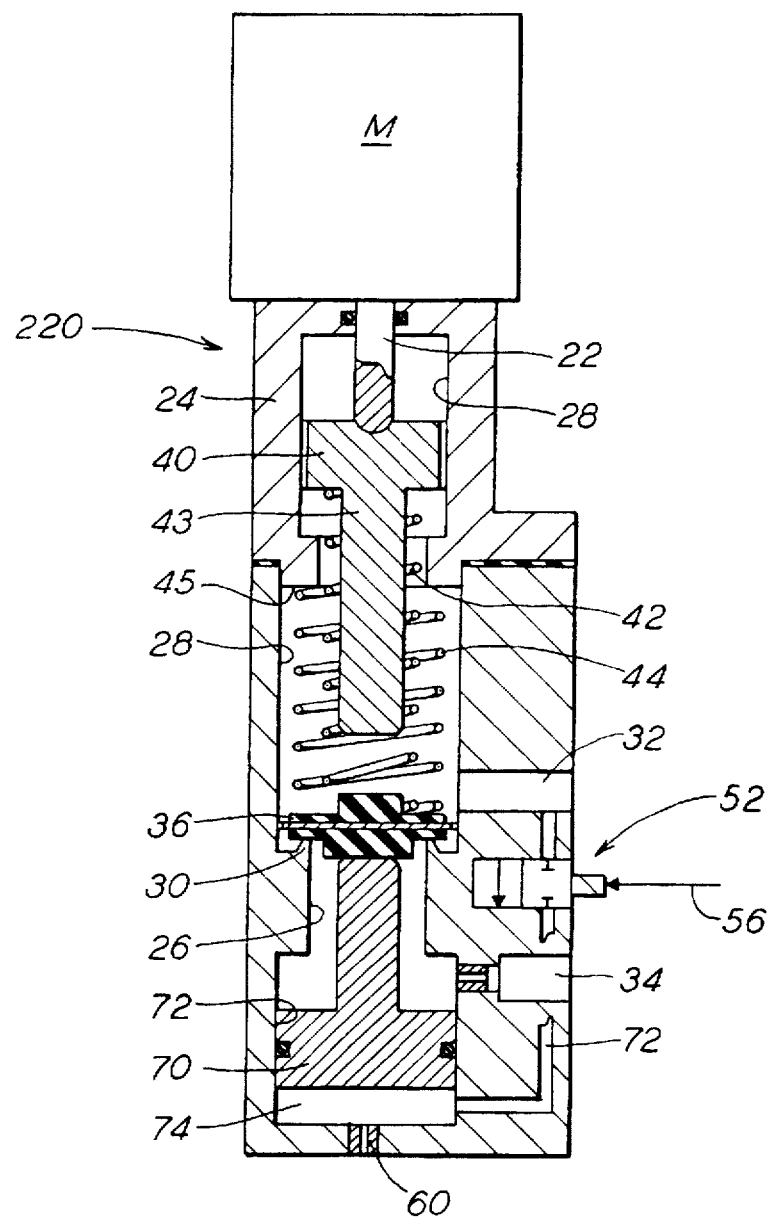
FIG. 7 is a sectional assembly view of a third embodiment of the regulating valve device of FIG. 2 arranged to permit failsafe recovery of brake pipe pressure.

In accordance with the command signal at input 9, microprocessor MPU outputs a target control signal that is connected by a wire 18 to an electric motor drive M of regulating valve device 20. As shown in FIGS. 4, 5 and 7, motor M is preferably a stepping motor arranged to adjust the linear displacement of an actuator stem 22 in discrete increments until a position corresponding to the target control signal is reached. Motor drive M is suitably mounted on the body 24 of regulating valve device 20 such that the linear position of stem 22 is repeatable for any given target control signal.

Referring now to FIG. 4, body 24 is formed with a bore 26 and a stepped counterbore 28. Bore 26 terminates at one end in an annular valve seat 30 that projects into counterbore 28. Opening into bore 26 is a supply port 32 to which branch pipe 10 is connected and opening into counterbore 28 is an exhaust port 34. A poppet type exhaust valve member 36 having a seal element 38 is disposed in counterbore 28 such that seal element 38 lies adjacent seat 30. Between valve member 36 and a spring seat 40 in stepped counterbore 28 is a helical control spring 42 that encircles a spring guide pin 43 of spring seat 40. Spring 42 acts on valve member 36 in a direction to effect engagement of valve seal element 38 with seat 30. Another helical spring 44 is located in counterbore 28 between valve member 36 and a shoulder 45, so as to also urge valve seal element 38 in a direction to engage seat 30. Whereas control spring 42 is adjustable under control of motor M in order to vary the compression force exerted on valve member 36, spring 44 is not adjustable and thus exerts a generally fixed bias force on valve member 36. This fixed bias force reduces the force motor M is required to develop to compress spring 42 sufficiently to maintain closure of valve 36 against the opposing air load and thus provides for a smaller size motor than would otherwise be required.

During charging of brake pipe BP to the desired operating pressure of the train, the corresponding command signal transmitted to the end-of-train unit is processed by microprocessor MPU to derive an appropriate target control signal at wire 18. Motor M is accordingly operated to extend actuator stem 22. The resulting linear position of stem 22 determines the degree of compression of control spring 42 and thus the force exerted on valve member 36 in conjunction with a predetermined fixed bias force exerted by spring 44. The total force exerted by springs 42 and 44 is selected to just slightly exceed the opposing force exerted on valve member 36 by the operating pressure to which brake pipe BP is charged. In this manner, valve member 36 is held closed to interrupt fluid pressure communication between supply port 32 and exhaust port 34 during charging in order to prevent brake pipe pressure from being exhausted at the regulating valve device 20. It is well understood that in response to this charging of brake pipe BP, the respective car control valve devices CV throughout the train are operated to a release position in which the brake cylinders BC are vented to release the brakes on each car.

Figure 3:
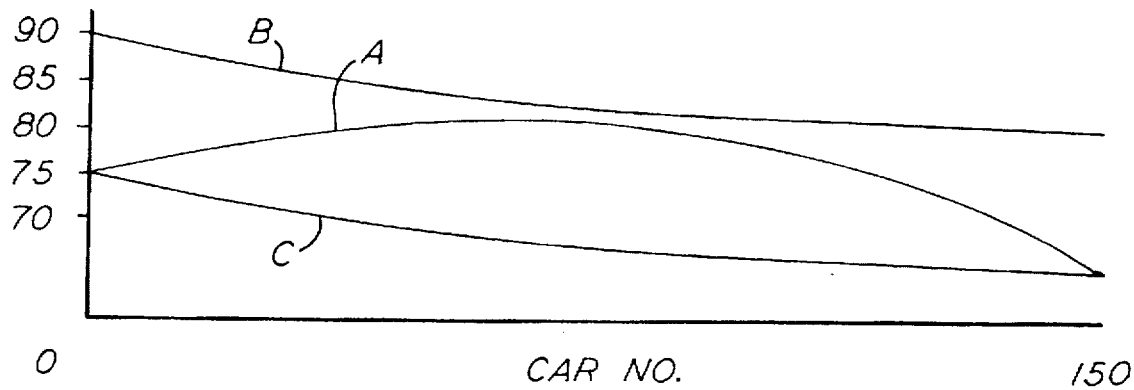
FIG. 3 is a graph illustrating how the brake pipe pressure gradient along a train changes during the transition from one pressure to a reduced pressure when making a pressure reduction concurrently at the front and rear ends of the train.

When a service brake application is subsequently initiated, brake pipe pressure is released at the locomotive in a well-known manner to initiate a predetermined reduction of brake pipe pressure at a service rate. A command signal corresponding to the reduced brake pipe pressure is concurrently transmitted to end-of-train unit EOT on car $C_{NL}$, where it is received and processed by microprocessor MPU. A target control signal is output by microprocessor MPU via wire 18 to operate stepping motor M. In that this target control signal differs in value from the target control signal output during charging of brake pipe BP, stepping motor M operates to retract actuating stem 22 and thereby relaxes the compression of control spring 42 and accordingly reduces the closure force acting on valve member 36. The effective force differential across valve member 36 is consequently reversed and valve member 36 is opened by reason of seal element 38 being unseated in accordance with the brake pipe pressure acting thereon. Fluid pressure communication is thus established between supply port 32 and exhaust port 34 and compressed air is accordingly released from brake pipe BP via branch pipe 10 and regulating valve 20 at end-of-train unit EOT. A choke fitting 46 is provided in exhaust port 34 to limit the maximum rate at which the brake pipe pressure is released when exhaust port 34 is fully open. It will be appreciated now that brake pipe pressure is thus reduced at end-of-train unit EOT concurrently with the reduction initiated at the front end of the train, until the pressure in the brake pipe at car $C_{NL}$ corresponds substantially to the effective target signal. This is accomplished by selfregulation of exhaust valve device 20, i.e., generally without intervention by stepping motor M after the spring compression is set in accordance with the brake pipe pressure reduction desired. As brake pipe pressure at end-of-train unit EOT approaches the desired target pressure, valve member 36 automatically finds and maintains the orifice necessary for the exhaust air flow to correspond to the air flowing from the middle of the train toward the rear, as illustrated by curve A in the graph of FIG. 3. Curve A represents brake pipe pressure during transition from the train operating pressure represented by curve B to a reduced pressure represented by curve A. The temporary higher brake pipe pressure near the middle of the train results from the normal restriction of air flow through the brake pipe BP, as the air exhausts at the front and rear of the train. Thus, until this pressure gradient is reduced to the natural pressure gradient of brake pipe BP, valve member 36 will continuously adjust its position to meet the flow demand due to this false pressure gradient. Only when the higher pressure source is dissipated and brake pipe pressure stabilizes at the desired target pressure will valve member 20 fully close.

When such stabilization occurs the opening force differential existing across valve member 36 is reversed, allowing spring 42 to seat valve element 38 of valve member 36 and thereby terminate the brake pipe reduction at end of-train unit EOT.

End-of-train unit EOT preferably includes, in addition to microprocessor unit MPU and regulating valve 20, a pressure transducer T, which sends an electric feedback signal via wire 16 to the microprocessor in accordance with the effective end-of-train brake pipe pressure. The feedback signal provides microprocessor MPU information with which microprocessor MPU can modify the command signal at input 9 in deriving an appropriate target signal at wire 18 that reflects the natural gradient in the brake pipe pressure from front to rear. In this manner, the pressure command at the end-of-train unit will result in a pressure reduction at car $C_{NL}$ corresponding substantially to the pressure reduction initiated at the locomotive, taking into account the natural brake pipe pressure gradient.

This brake pipe pressure reduction will cause control valves CV on each car N in the train to make a service brake application corresponding to the brake pipe pressure reduction in effect. Moreover, the pressure reduction occurs more uniformly along the train and thus reduces undesired dynamic forces between cars.

In FIG. 5 is shown a similar regulating valve device 120 that permits brake pipe recharge following a fault condition that disables microprocessor MPU. Such fault condition is known to result from a power outage or a microprocessor malfunction. This FIG. 5 embodiment of regulating valve 120 includes a nullification valve 50 and an actuator piston 54 that is disposed in a control chamber 52 formed in stepped counterbore 28 between spring seat 40 and actuator piston 54. Control spring 42 is disposed in control chamber 52 so as to bear against actuator piston 54 with a force of compression corresponding to the linear position of actuator shaft 22, as set by motor M. Force due to either compression of spring 42 or brake pipe pressure supplied to chamber 52 via nullification valve 50 may independently effect closure of valve member 36 through the intermediary of actuator piston 54.

Nullification valve 50 may be a standard solenoid-operated, two-way, two-position, spring-returned, electro-pneumatic valve, the solenoid operator of which is connected to an output of microprocessor MPU via a wire 56. A control passage 58 between supply port 32 and control chamber 52 contains the valving of nullification valve 50, which is represented diagrammatically in FIG. 5 for ease of understanding. Nullification valve 50 is normally open and thus establishes pressurization of chamber 52 when deenergized. In its energized condition, nullification valve 50 interrupts the supply of air to chamber 52, which is accordingly depressurized via a bleed port 60.

In the absence of a fault condition of microprocessor MPU, regulating valve device 120 operates under control of motor M in the same manner as explained relative to operation of regulating valve 20, since control chamber 52 is depressurized in accordance with the energized condition of nullification valve 50.

When a fault condition of microprocessor MPU occurs, however, operation of motor M is interrupted and the solenoid operator of nullification valve 50 is concurrently deenergized. Since nullification valve 50 in this deenergized condition establishes pressurization of control chamber 52, actuator piston 54 exerts a closure force on exhaust valve member 36 independently of control spring 42 to interrupt the exhaust of brake pipe pressure via exhaust port 38 of regulating valve device 120. In this manner, brake pipe pressure is capable of being re-charged to release the train brakes, notwithstanding the fact that the valve closure force exerted by control spring 42 may be absent or at least reduced due to motor M being disabled in accordance with the occurrence of a fault condition of microprocessor MPU during a brake application. It will be appreciated that without some means of overriding the motor control, failsafe recovery of brake pipe pressure would not be obtained, since any increase in brake pipe pressure above the effective force of springs 42, 44 would unseat valve member 36 and blow off the brake pipe pressure as it is being re-charged from the locomotive L.

In that bleed port 60 connects control chamber 52 directly to atmosphere, the air supplied to chamber 52 when a fault condition exists is continuously vented. If this air bleed is considered excessive and thus undesirable, two-way nullification valve 50 may be replaced by a three-way valve 51, as shown in FIG. 6. This would permit bleed port 60 to be relocated in the exhaust outlet of three-way nullification valve 51, as shown, in order to only vent control chamber 52 when supply pressure is cut off therefrom.

FIG. 7 shows a third embodiment of a regulating valve device 220 that is similar to regulating valve device 120 of FIG. 5, with respect to springs 42, 44, actuator stem 22, spring seat 40, poppet valve member 36, and nullification valve 50. However, this nullification valve 50 of regulating valve device 220 is normally closed, as opposed to the normally open configuration in FIG. 5. In addition, the supply and exhaust ports 32, 34 are reversed and valve member 36 includes an actuator piston 70 that is operatively disposed in a counterbore 72 formed in the end of bore 26 opposite the end having stepped counterbore 28. Formed in counterbore 72 between body 24 and piston 70 is a control chamber 74 to which a control passage 76 is connected from supply port 32. As shown diagrammatically, the valving of nullification valve 50 is arranged to either open or close passage 76.

In the normally closed deenergized condition of nullification valve 50, as shown, control passage 76 is interrupted to cut off the supply of air from brake pipe supply port 32 to control chamber 74, which is vented via bleed port 60 to assure closure of valve member 36, in the event of a fault condition of microprocessor MPU.

In this embodiment of regulating valve device 220, spring 42 is initially set by motor M to exert in conjunction with spring 44 a force on valve member 36 that is slightly less than the counteracting force of brake pipe air at operating pressure acting on the differential area of valve member 36 and actuator piston 70. Thus, when a brake pipe pressure command is received at the end-of-train unit EOT, corresponding to a brake application, microprocessor MPU operates motor M to relax the compression of spring 42, as previously explained, while concurrently energizing the solenoid operator of nullification valve 50.

Being of relatively small size, nullification valve 50 has a fast response characteristic, which results in near instantaneous communication of control chamber 74 with supply port 32 via control passage 76. The existing pressure differential maintaining closure of valve member 36 prior to nullification valve 50 being energized (by reason of control chamber 74 being depressurized) is thus quickly reversed to unseat valve member 36, even if the response of motor M is delayed such that no reduction of spring force has yet occurred. Thus, brake pipe pressure begins to exhaust without any undue delay and continues to exhaust until the brake pipe pressure corresponds to the desired target pressure, as previously explained.

In the event a fault condition of microprocessor MPU arises during a brake application, motor M will be disabled and thus unable to reset spring 42 to its initial condition of compression. Since the solenoid operator of nullification valve 50 is powered via microprocessor MPU, however, nullification valve 50 is also deenergized during the aforementioned fault condition of microprocessor MPU. In its deenergized condition, nullification valve 50 interrupts the supply of brake pipe air to control chamber 74. Being of relatively small capacity, control chamber pressure is quickly dissipated via bleed port 60 to re-establish the initial effective differential pressure area of valve member 36 in the direction of valve closure. As brake pipe pressure is subsequently increased to release the brake application, closure of valve member 36 is thus maintained to assure recharge of brake pipe BP to its desired operating pressure. This allows the train to proceed under direct control of the locomotive without requiring any action on the part of the train operating personnel to reset and/or cut out regulating valve 220.

When a brake release is desired in the absence of any fault condition existing, the corresponding command signal received at end-of-train unit EOT is responded to by microprocessor MPU, which transmits an appropriate command signal to motor M, as previously explained, in order to compress spring 42 in accordance with its initial setting depending upon the train operating pressure. Concurrently, microprocessor MPU deenergizes wire 56 to cause nullification valve 50 to assume its cut-off position. The pressure effective in control chamber 74 is thus dissipated via bleed port 60 so that the effective pressure differential across valve member 36 is in the direction of valve closure in order to prevent the re-charging brake pipe pressure from escaping to atmosphere. It will be appreciated, therefore, that regulating valve device 220 is reset immediately upon reception of the release command signal and without waiting for motor M to re-establish the release setting of spring 42.

We claim:

1. A control system for reducing the fluid pressure carried in a brake pipe of a railroad train at a location remote from the train locomotive in response to and concurrent with a brake pipe pressure reduction initiated at the locomotive comprising:

a) processor means including a microprocessor for receiving at said remote location a command signal corresponding to a reduced brake pipe pressure;
    b) transducer means for providing a feedback signal to said microprocessor corresponding to the fluid pressure effective in said brake pipe at said remote location;
    c) said microprocessor having a first output providing a target signal representative of a desired brake pipe pressure at said remote location as derived from said command signal and said feedback signal; and
    d) a regulating valve device operative at said remote location including:
        (i) a body;
        (ii) a supply port in said body to which fluid under pressure is connected from said brake pipe;
        (iii) an exhaust port in said body open to atmosphere;
        (iv) an exhaust valve member for controlling fluid pressure communication between said supply and exhaust ports, the fluid pressure effective at said supply port acting on said exhaust valve member in a direction to effect opening thereof;
        (v) a control spring acting on said valve member in opposition to the fluid pressure acting thereon to urge said valve member in a direction to effect closure thereof; and
        (vi) electric motor means operable in response to said target signal for adjusting the force exerted on said exhaust valve member by said control spring.

2. A control system as recited in claim 1, wherein said electric motor means comprises:
    a) a stepping motor; and
    b) a first actuator stem axially displaceable by said stepping motor to a discrete position corresponding to said target signal.

3. A control system as recited in claim 1, wherein said regulating valve device further comprises a bias spring between said body and said valve member, said bias spring acting on said valve member in the direction of engagement with said valve seat.

4. A control system as recited in claim 2, wherein said regulating valve device further comprises:
    a) said exhaust valve member including a fixed valve seat and a movable valve element engageable therewith;
    b) a first bore in said body terminating in said fixed valve seat;
    c) a counterbore of said first bore;
    d) said fixed valve seat projecting into said counterbore;
    e) said supply port having a connection to said first bore; and
    f) said exhaust port having a connection to said counterbore.

5. A control system as recited in claim 4, wherein said regulating valve device further comprises:
    a) pneumatic actuator means having a fault condition for effecting closure of said exhaust valve member; and
    b) electro-pneumatic means for providing said fault condition of said pneumatic actuator means when said stepping motor is disabled by the absence of electric power thereto.

6. A control system as recited in claim 5, said processor means further having a second output for providing a fault signal in response to which said electro-pneumatic means is operated.

7. A control system as recited in claim 5, wherein said regulating valve device further comprises:
    a) a second bore in said body opening into said counterbore;
    b) said pneumatic actuator means including a piston member operably disposed in said second bore and a second actuator stem of said piston member projecting into said counterbore for engagement with said exhaust valve member in the direction of closure thereof.

8. A control system as recited in claim 7, wherein said regulating valve device further comprises:

a) a spring seat sealingly disposed in said second bore in spaced-apart relationship with said piston member to form a control chamber therebetween;

b) said control spring being disposed in said control chamber between said spring seat and said piston member; and c) said first actuator stem being engaged with said spring seat to vary the degree of compression of said control spring under the influence of said stepping motor.

9. A control system as recited in claim 8, wherein said electro-pneumatic means comprises a two-position, two-way pneumatic valve having a solenoid operator, an inlet connected to said supply port and an outlet connected to said control chamber.

10. A control system as recited in claim 9, wherein said pneumatic valve in a deenergized condition of said solenoid operator establishes fluid pressure communication between said inlet and said outlet.

11. A control system as recited in claim 10, wherein said regulating valve device further comprises means for continuously venting said control chamber.

12. A control system as recited in claim 8, wherein said electro-pneumatic means comprises a two-position, three-way pneumatic valve having a solenoid operator, an inlet connected to said supply port, an outlet connected to said control chamber and a vent.

13. A control system as recited in claim 12, wherein said pneumatic valve in a deenergized condition of said solenoid operator establishes fluid pressure communication between said inlet and said outlet, and in said energized condition establishes fluid pressure communication between said vent and said outlet.

14. A control system as recited in claim 7, wherein the pressure area of said piston member within said second bore is substantially the same as the pressure area of said valve member within the periphery of said valve seat.

15. A control system as recited in claim 2, wherein said regulating valve device further comprises:

a) said valve member including a fixed valve seat and a movable valve element engageable therewith;

b) a bore in said body terminating in said fixed valve seat;

c) a first counterbore of said bore into which said fixed valve seat projects;

d) a second counterbore of said bore having a greater diameter than said bore;

e) a piston actuator operably disposed in said second counterbore and engageable with said movable valve element in said opening direction thereof; and f) said exhaust port having a connection to said second counterbore at one end of said piston actuator and said supply port having a connection to said second counterbore at the end of said piston actuator opposite said one end and to said first counterbore, said valve member including said piston actuator having a greater differential pressure area in said direction of opening.

16. A control system as recited in claim 15, wherein said regulating valve device further comprises electro-pneumatic means for controlling fluid pressure communication via said connection between said supply port and said second counterbore.

17. A control system as recited in claim 16, wherein said electro-pneumatic means comprises a two-position, two-way pneumatic valve having a solenoid operator, an inlet connected to said supply port and an outlet connected to said second counterbore at said opposite end of said piston actuator, said outlet being cut-off from said inlet in a deenergized condition of said solenoid operator and connected to said inlet in an energized condition of said solenoid operator.

18. A control system as recited in claim 17, wherein said regulating valve device further comprises means for continuously venting said second counterbore at said opposite end of said piston actuator.

19. A control system as recited in claim 17, said processor means further having a second output for providing a fault signal in response to which said solenoid operator is operated.

20. A control system as recited in claim 15, wherein said regulating valve device further comprises a bias spring between said movable valve element and said body urging said exhaust valve member in said direction of closure.

21. A control system as recited in claim 3, wherein said regulating valve device further comprises:

a) said exhaust valve member including a fixed valve seat and a moveable valve element engagable therewith, said control spring engaged with said moveable valve element;

b) a first bore in said body terminating in said fixed valve seat;

c) a stepped counterbore of said first bore;

d) said fixed valve seat projecting into said stepped counterbore;

e) said supply port having a connection to said first bore;

f) said exhaust port having a connection to said stepped counterbore; and g) said bias spring engaged with said moveable valve member.

22. A control system according to claim 21 wherein said bias spring contacts said body at an inside shoulder of said stepped counterbore.

23. A control system according to claim 1 further comprising a moveable spring seat, said moveable spring seat positionable by said motor, said control spring seated against said moveable spring seat, so that said motor is operable for adjusting the force exerted on said exhaust valve member by said control spring.

24. A control system according to claim 23 further comprising a spring guide pin disposed within said control spring to guide said control spring.

25. A control system according to claim 24 wherein said spring guide pin is at least one of connected to and attached to said moveable spring seat.

26. A control system according to claim 23 further having an actuator stem moved by said electric motor means, said actuator stem in contact with said moveable spring seat.

* * * * *